(12) United States Patent
Benisty

(10) Patent No.: US 12,488,863 B1
(45) Date of Patent: Dec. 2, 2025

(54) ELECTRONIC HEALTH RECORDS AGENT APPLICATION FOR HIGHLIGHTING CONTEXTUALLY RELEVANT INFORMATION

(71) Applicant: Allscripts Software, LLC, Raleigh, NC (US)

(72) Inventor: Eli Benisty, Beer Sheva (IL)

(73) Assignee: ALTERA DIGITAL HEALTH, INC., Niagara Falls, NY (US)

(*) Notice: Subject to any disclaimer, the term of this patent is extended or adjusted under 35 U.S.C. 154(b) by 955 days.

(21) Appl. No.: 16/135,020

(22) Filed: Sep. 19, 2018

(51) Int. Cl.
- *G16H 10/60* (2018.01)
- *G06F 3/0482* (2013.01)
- *G06N 20/00* (2019.01)
- *H04L 67/12* (2022.01)

(52) U.S. Cl.
CPC ............. *G16H 10/60* (2018.01); *G06N 20/00* (2019.01); *H04L 67/12* (2013.01); *G06F 3/0482* (2013.01)

(58) Field of Classification Search
None
See application file for complete search history.

(56) References Cited

U.S. PATENT DOCUMENTS

| | | |
|---|---|---|
| 2009/0307755 A1 | 12/2009 | Dvorak et al. |
| 2012/0215560 A1* | 8/2012 | Ofek ............ G16H 10/00 705/3 |
| 2013/0238349 A1 | 9/2013 | Sethumadhavan et al. |
| 2013/0290019 A1* | 10/2013 | Pressler ............ G16H 30/20 705/3 |
| 2013/0332194 A1 | 12/2013 | D'Auria et al. |
| 2014/0236922 A1* | 8/2014 | Boyer ............ G06F 19/00 707/722 |
| 2014/0278549 A1* | 9/2014 | Fritsch ............ G16H 80/00 705/3 |

(Continued)

FOREIGN PATENT DOCUMENTS

WO  WO-2019022779 A1 * 1/2019 ............ G06N 3/045

OTHER PUBLICATIONS

Rajkomar et al., Scalable and accurate deep learning with electronic health records, NPJ Digital Medicine (2018)1:18, doi: 10.1038/s41746-018-0029-1 (Year: 2018).*

*Primary Examiner* — Jason B Dunham
*Assistant Examiner* — Nicholas Akogyeram, II
(74) *Attorney, Agent, or Firm* — CALFEE, HALTER & GRISWOLD LLP

(57) ABSTRACT

An improved electronic health records agent application (EHR agent) is disclosed herein. A server EHR agent receives an identifier for a healthcare worker and an identifier for a patient from a client computing device. The server EHR agent retrieves an audit table for the healthcare worker using the identifier for the healthcare worker and a virtual patient object (VPO) for the patient using the identifier for the patient. The audit table comprises a history of interactions of the healthcare worker with the EHR agent. The VPO comprises domains of clinical data for the patient aggregated from a plurality of sources. The server EHR agent provides the audit table and the VPO to a computer-implemented machine learning model, wherein the machine learning model identifies a subset of domains in the domains of clinical data that is likely to be used by the healthcare worker in treating the patient.

20 Claims, 9 Drawing Sheets

(56) References Cited

U.S. PATENT DOCUMENTS

| | | | |
|---|---|---|---|
| 2015/0164430 A1* | 6/2015 | Hu | A61B 5/7282 |
| | | | 600/595 |
| 2016/0019356 A1* | 1/2016 | Martin | G16H 10/60 |
| | | | 705/2 |
| 2017/0083672 A1* | 3/2017 | Juneau | G06Q 50/22 |
| 2017/0109651 A1* | 4/2017 | Bruno | G06F 40/103 |
| 2017/0140114 A1 | 5/2017 | Are et al. | |
| 2017/0212989 A1* | 7/2017 | LaBorde, Jr. | G06F 3/0485 |
| 2017/0262604 A1* | 9/2017 | Francois | G16H 50/20 |
| 2018/0083988 A1* | 3/2018 | Kataoka | G06F 21/577 |
| 2018/0121613 A1 | 5/2018 | Connely, IV et al. | |
| 2019/0026434 A1* | 1/2019 | Yadav | G16H 10/60 |
| 2019/0034591 A1* | 1/2019 | Mossin | G16H 10/60 |
| 2019/0362368 A1* | 11/2019 | Levy | G06F 16/22 |
| 2019/0392324 A1* | 12/2019 | Devarakonda | G16H 10/00 |
| | | | 705/3 |

\* cited by examiner

| | |
|---|---|
| DOE, John<br>40 y \| Male | 502 |
| EXTERNAL APPLICATIONS | 504 |
| OPTIONS | |
| ▲ Encounters | 506 |
| ▲ Problems | 508 |
| ▲ Past Medical History | 510 |
| ▲ Diagnoses | 512 |
| ▲ Allergies | 514 |
| ▲ Medications | 516 |
| ▲ Measurements | 518 |
| ▲ Labs | 520 |
| ▲ Pathology | 522 |
| ▲ Immunizations | 524 |
| ▲ Imaging | 526 |
| ▲ Procedures | 528 |
| ▲ Documents | 530 |
| ▲ External Documents | 532 |
| | 534 |

DOE, John
40 y | Male                              502

EXTERNAL APPLICATIONS           504

OPTIONS

▲ Labs                      506
▲ Problems                      522
▲ Past Medical History          510
▲ Diagnoses                     512
▲ Allergies                     514
▲ Medications               516
▲ Measurements                  518
▲ Encounters                    520
▲ Pathology                     508
▲ Immunizations                 524
▲ Imaging                       526
▲ Procedures                    528
▲ Documents                     530
▲ External Documents            532
                                534

ELECTRONIC HEALTH RECORDS AGENT APPLICATION FOR HIGHLIGHTING CONTEXTUALLY RELEVANT INFORMATION

BACKGROUND

Electronic health records applications (EHRs) are computer-executable applications that are configured to assist healthcare workers with providing care to patients. EHRs are configured with functionality pertaining to patient intake, patient billing, insurance billing, prescription generation, maintaining a record of patient care over time, etc. EHRs are often used by healthcare workers at the point of care (i.e., at a time when the healthcare worker is providing care to a patient). For example, a healthcare worker may retrieve data from a patient record maintained by an EHR to relatively quickly ascertain problems being experienced by the patient, medications currently being taken by the patient, and so forth.

When a patient receives care at different healthcare facilities that utilize different EHRs, health records of the patient may become scattered across different, non-interoperable EHRs, as well as other computing systems external to the EHRs. For a variety of technological, legal, and business reasons, an EHR is typically not configured to interface with applications external to the EHR (e.g., other EHRs, health information exchanges (HIEs), third-party applications, etc.). As such, electronic health records agent applications (EHR agents) have been developed. EHR agents are computer-executable applications that are configured to run alongside an EHR in order to provide a healthcare worker with access to data (e.g., clinical data) that is normally inaccessible to the EHR (e.g., data retained by other EHRs, data retained by HIEs, data retained by third-party applications, etc.). Thus, EHR agents enable healthcare workers to access a more complete version of the health records of the patient than is possible when using only an EHR.

Conventional EHR agents are associated with various deficiencies. First, health records of a patient as maintained by an EHR agent may be very large as the health records of the patient may be gathered from many different sources. Thus, it is difficult for conventional EHR agents to effectively and efficiently display relevant health records of the patient to a healthcare worker. Second, oftentimes many parts of the health records of the patient as maintained by the EHR agent are not currently relevant in treating the patient. In these situations, transmitting all of the health records of the patient to a client computing device for display can lead to an inefficient use of network resources.

SUMMARY

The following is a brief summary of subject matter that is described in greater detail herein. This summary is not intended to be limiting as to the scope of the claims.

Disclosed herein are various technologies pertaining to an electronic health records agent application (EHR agent) that supplements an electronic health records application (EHR). The EHR agent is a distributed application that includes both server-side functionality (server EHR agent) and client-side functionality (client EHR agent). The server EHR agent and the client EHR agent work in conjunction with one another in order to present contextually relevant information (identified by a computer-implemented machine learning model) to a healthcare worker. More specifically, the contextually relevant information includes data from clinical domains that is likely to be used by the healthcare worker in treating a patient.

In operation, a client computing device operated by a healthcare worker transmits an identifier for the healthcare worker to the server EHR agent. Prior to, concurrently with, or subsequent to transmitting the identifier for the healthcare worker to the server EHR agent, the client computing device also transmits an identifier for a patient to the server EHR agent.

The server EHR agent retrieves an audit table for the healthcare worker using the identifier for the healthcare worker. More specifically, the server EHR agent may execute a search over a data store retaining audit tables for different healthcare workers, wherein the search is based upon the identifier for the healthcare worker. The search produces search results, wherein the search results include the audit table for the healthcare worker. The audit table for the healthcare worker is a history of interactions of the healthcare worker with the client EHR agent.

The server EHR agent also retrieves a virtual patient object (VPO) for the patient using the identifier for the patient. More specifically, the server EHR agent may execute a search over a data store retaining VPOs for different patients, wherein the search is based upon the identifier for the patient. The search produces search results, wherein the search results include the VPO for the patient.

The VPO comprises domains of clinical data for the patient aggregated from a plurality of sources. For instance, the plurality of sources may include different EHRs, health information exchanges (HIEs), and/or third-party applications (i.e., non-EHR applications, non-HIEs, etc.). The domains of clinical data may include at least one of encounters of the patient, problems of the patient, a medical history of the patient, diagnoses of the patient, allergies of the patient, medications of the patient, measurements of the patient, lab results of the patient, a pathology of the patient, immunizations of the patient, imaging of the patient, procedures that the patient has undergone, documents of the patient, and/or external documents of the patient.

The server EHR agent then provides the audit table and the VPO as input to a computer-implemented machine learning model having learned weights assigned thereto. The machine learning model identifies a subset of domains in the domains of clinical data based upon the audit table, the VPO, and the learned weights. The subset of domains is likely to be used by the healthcare worker in treating the patient. More specifically, the machine learning model may output a value for each domain of clinical data. The value for each domain is indicative of a likelihood that the healthcare worker will use (data in) the domain of clinical data in treating the patient.

The server EHR agent then generates an optimized VPO for the patient by marking each domain in the subset of domains within the VPO. More specifically, the server EHR agent may cause data indicative of contextual relevance of each domain of clinical information to be included within the VPO. In an example, if the output of the machine learning model indicates that medications and laboratory results of the patient are likely to be used by the healthcare worker in treating the patient, the server EHR agent may mark the domain for medications of the patient and the domain for laboratory results of the patient within the VPO.

Subsequently, the server EHR agent transmits the optimized VPO to the client EHR agent. Responsive to receiving the optimized VPO, the client EHR agent presents identifiers for the domains of clinical data of the optimized VPO within a graphical user interface (GUI) for the client EHR agent. As a result of the marking of each domain in the subset of domains within the optimized VPO, identifiers for the subset of domains are visually highlighted within the GUI to indicate that the subset of domains are likely to be used by the healthcare worker in treating the patient. In an embodiment, the GUI for the client EHR agent may be presented as an overlay to a second GUI for a client EHR executing on the client computing device.

In an embodiment, the machine learning model may additionally identify a second subset of domains in the domains of clinical data based upon the audit table, the VPO, and the learned weights. The second subset of domains is likely to not be used by the healthcare worker in treating the patient. The server EHR agent also marks each domain in the second subset of domains. In the embodiment, the server EHR agent may remove the second subset of domains (while retaining identifiers for the second subset of domains) from the optimized VPO prior to transmitting the optimized VPO to the client EHR agent. The server EHR agent transmits the optimized VPO to the client EHR agent. Responsive to receiving the optimized VPO, the client EHR agent presents identifiers for the domains of clinical data within a GUI for the client EHR agent. As a result of the marking of each of the subset of domains, identifiers for the subset of domains are visually highlighted with first visual indicia within the GUI to indicate that the subset of domains is likely to be used by the healthcare worker in treating the patient. As a result of the marking of each of the second subset of domains, identifiers for the second subset of domains are visually highlighted with second visual indicia within the GUI to indicate that the second subset of domains is not likely to be used by the healthcare worker in treating the patient. In the event that the healthcare worker wishes to view data from a domain in the second subset of domains, the client EHR agent can receive an identifier for the domain of clinical data in the second subset of domains as input from the healthcare worker. The client EHR agent can then transmit the identifier for the domain of clinical data to the server EHR agent. The server EHR agent then retrieves data from the domain of clinical data from the VPO using the identifier for the domain of clinical data. The server EHR agent transmits the data from the domain to the client EHR agent, wherein the client EHR agent presents the data from the domain within the GUI.

The above-described technologies present various advantages over conventional EHR agents. First, through use of the computer-implemented machine learning model, the EHR agent can identify domains of clinical data that are likely to be used by a healthcare worker in treating a patient and can cause identifiers for the domains of clinical data to be visually highlighted within a GUI for the EHR agent, thereby highlighting their relevance to a healthcare worker when the healthcare worker is treating the patient. Second, as the EHR agent described above can remove domains of clinical information that are not likely to be used by the healthcare worker in treating the patient from the optimized VPO, the optimized VPO may be made smaller (i.e., the optimized VPO includes less data), thus saving network resources when the optimized VPO is transmitted over a network to a client computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 is a depiction of an exemplary GUI for a client electronic health records agent application (client EHR agent).

FIG. 6 is a depiction of an updated exemplary GUI for the client EHR agent that highlights contextually relevant information.

DETAILED DESCRIPTION

Figure 1:
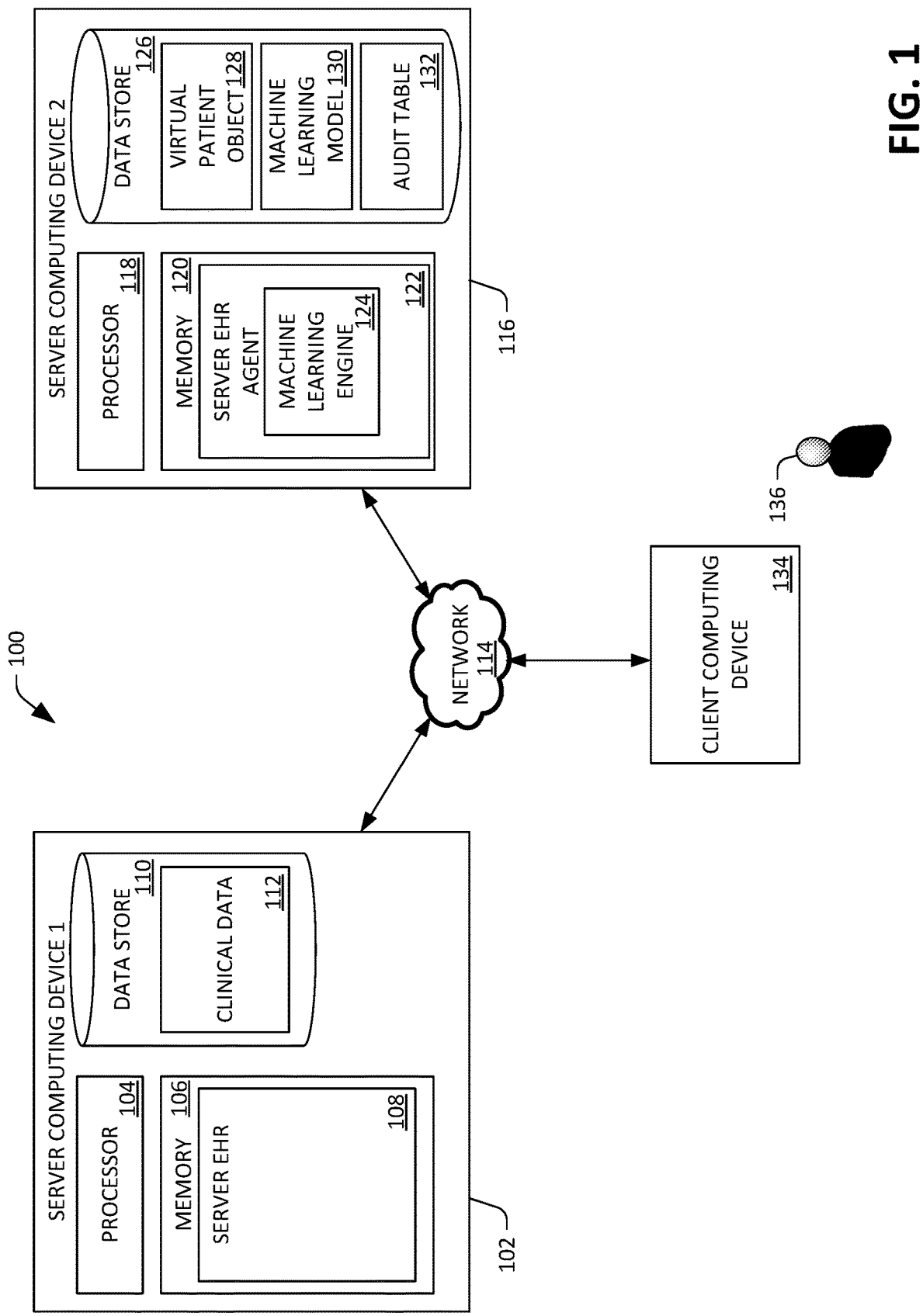
FIG. 1 is a functional block diagram of an exemplary computing system that facilitates presenting contextually relevant information to a healthcare worker.

Various technologies pertaining to presenting contextually relevant information to a healthcare worker are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary computing system 100 that facilitates optimizing a virtual patient object (VPO) for a patient in order to present contextually relevant information to a healthcare worker is illustrated. The computing system 100 includes a first server computing device 102. The first server computing device 102 comprises a processor 104 and memory 106, wherein the memory 106 has a server electronic health records application (server EHR) 108 loaded therein. In general, the server EHR 108 is configured to perform a variety of tasks related to patient healthcare in a healthcare facility (e.g., patient intake, prescription generation, patient record creation and maintenance, etc.).

The first server computing device 102 may additionally comprise a data store 110. The data store 110 includes clinical data 112 for patients (amongst other data), wherein the clinical data 112 is maintained by the server EHR 108. The clinical data 112 may include electronic health records, prescription records, claims data, patient/disease registries data, health surveys data, and/or clinical trials data. In an embodiment, the clinical data 112 includes domains of clinical data discussed below in the description of FIG. 2.

The computing system 100 also includes a second server computing device 116 that is in communication with the first server computing device 102 by way of a network 114 (e.g., the Internet, intranet, etc.). The second server computing device 116 comprises a processor 118 and memory 120, wherein the memory 120 has a server electronic health records agent application (server EHR agent) 122 loaded therein. In general, the server EHR agent 122 is configured to retrieve and maintain clinical data for patients from sources inaccessible to the server EHR 108. For instance, the server EHR agent 122 may retrieve and maintain clinical data for patients from different EHRs, health information exchanges (HIEs), third-party applications, etc. As will be described in greater detail below, the server EHR agent 122 includes a machine learning engine 124 that is configured to execute a computer-implemented machine learning model that identifies contextually relevant information of a patient for a healthcare worker 136.

While the machine learning engine 124 is depicted as being part of the server EHR agent 122 executing on the second server computing device 116, it is to be understood that the machine learning engine 124 may execute on a server computing device separate from the second server computing device 116. For instance, the machine learning engine 124 may execute on a cloud based computing system that also stores the machine learning model.

The second server computing device 116 may include a data store 126. The data store 126 may comprise a computer-implemented virtual patient object (VPO) 128 for a patient, a computer-implemented machine learning model 130, and an audit table 132 for the healthcare worker 136.

Figure 2:
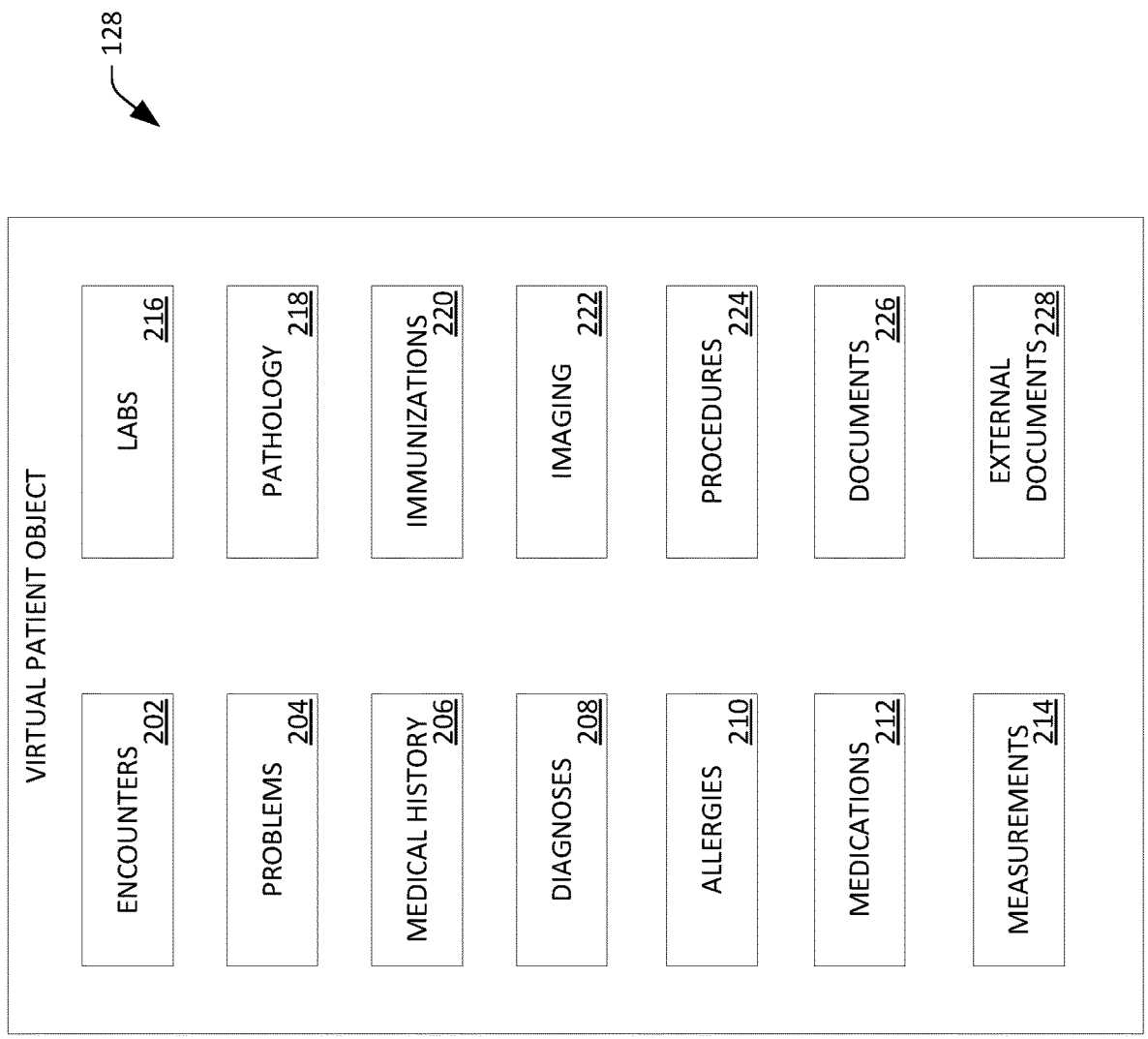
FIG. 2 is a functional block diagram of an exemplary virtual patient object (VPO).

Referring briefly now to FIG. 2, a functional block diagram of the VPO 128 for a patient is depicted. The VPO 128 comprises domains of clinical data 202-228 for a patient that are aggregated from a plurality of sources. For instance, the plurality of sources many include different EHRs (e.g., a first (server) EHR, a second (server) EHR, etc.), HIEs, third-party applications, etc.

The domains of clinical data 202-228 for the patient may include encounters 202 of the patient, problems 204 experienced by the patient, a medical history 206 of the patient, diagnoses 208 of the patient, allergies 210 of the patient, medications 212 of the patient, measurements 214 of the patient, lab results 216 of the patient, a pathology 218 of the patient, immunizations 220 of the patient, imaging of the patient 222, procedures 224 that the patient has undergone, documents 226 of the patient, and/or external documents 228 of the patient.

It is understood that there may be some overlap between data in the clinical data 112 and the domains of clinical data 202-228 in the VPO 128. However, it is to be appreciated that the clinical data 112 is data generated only by the EHR (i.e., the server EHR 108 and the client EHR 306), whereas data in the domains of clinical data 202-228 in the VPO 128 is generated from a plurality of sources. Moreover, while the data store 126 is depicted as retaining a single VPO for a single patient, it is to be understood that the data store 126 may retain many different VPOs for many different patients.

Returning to FIG. 1, in an example, the computer-implemented machine learning model 130 comprise nodes and edges that couple nodes in the machine learning model 130. Thus, for instance, the machine learning model 130 may be an artificial neural network (ANN), a Bayesian model, a deep neural network (DNN), a recurrent neural network (RNN), or the like. In another example, the machine learning model 130 may be or include a support vector machine (SVM) or other suitable classifier. When the machine learning model 130 comprises nodes and edges, each edge is assigned a learned weight, wherein the weight can be learned using a supervised or unsupervised learning procedure. Accordingly, for instance, a weight assigned to an edge can be influenced by feedback from the healthcare worker 136 (or another healthcare worker) when treating patients. The server EHR agent 122 provides the VPO 128 (or a portion of the VPO 128) and the audit table 132 (or a portion of the audit table 132) as input, and the machine learning engine 124 executes the machine learning model 130 such that the machine learning model 130 generates an output based upon the input and the weights assigned to the edges. The output identifies a first subset of domains in the domains of clinical data (described above) that are likely to be used by the healthcare worker 136 when treating the patient. The output may also identify a second subset of domains in the domains of clinical data that are not likely to be used by the healthcare worker 136 when treating the patient.

While the data store 126 is illustrated as including a single computer-implemented machine learning model assigned to the healthcare worker 136, it is understood that the data store 126 can include a plurality of computer-implemented machine learning models assigned to many different healthcare workers. Thus, in an embodiment, the server EHR agent 122 may select the machine learning model 130 from amongst the plurality of machine learning models based upon an identifier for the healthcare worker 136.

Additionally, the data store 126 can include a general computer-implemented machine learning model assigned to a healthcare organization (e.g., a healthcare organization to which the healthcare worker 136 belongs). Thus, it is to be understood that the machine learning model 130 may be derived over time from the general machine learning model assigned to the healthcare organization.

Moreover, it is also to be understood that the data store 126 may retain sets of weights assigned to different healthcare workers. Thus, in an embodiment, the server EHR agent 122 may retrieve a set of weights assigned to the healthcare worker 136 using an identifier for the healthcare worker 136. The server EHR agent 122 may then replace learned weights of the machine learning model 130 with the set of weights assigned to the healthcare worker 136 prior to providing the VPO 128 and the audit table 132 as input to the machine learning model 130.

The audit table 132 comprises a history of interactions of the healthcare worker 136 with a (client) EHR agent. In a specific example, the audit table 132 may include an identifier for a domain of clinical data in the domains of clinical data that has previously been selected by the healthcare worker 136 within the (client) EHR agent, an indication of a datetime (i.e., a date and a time on the date) on which the domain was selected, an identifier for the patient to which the domain of clinical data corresponds, etc. While the data store 126 is depicted as retaining a single audit table, it is to be understood that the data store 126 may retain many different audit tables for many different healthcare workers.

While the VPO 128, the machine learning model 130, and the audit table 132 are depicted as being retained in the data store 126, it is to be understood that the VPO 128, the machine learning model 130, and the audit table 132 may be retained in different data stores. The VPO 128, the machine learning model 130, and the audit table 132 may also be retained in different data stores on different server computing devices.

The computing system 100 additionally includes a client computing device 134 operated by a healthcare worker 136. The client computing device 134 is in communication with the first server computing device 102 and the second server computing device 116 by way of the network 114 (or another network).

Figure 3:
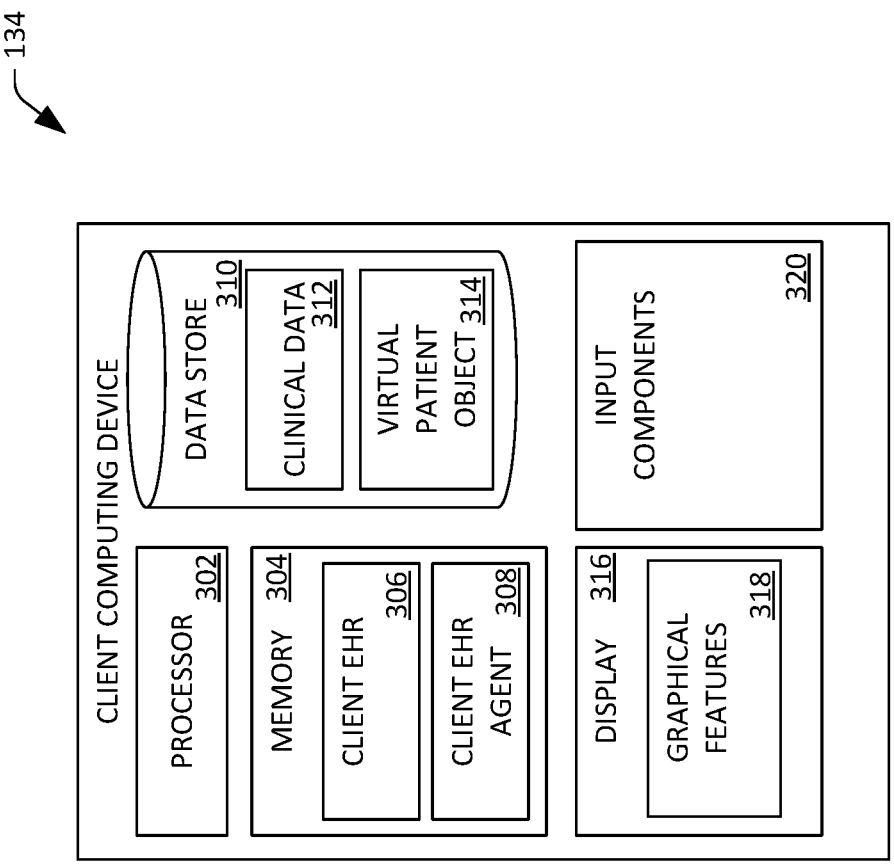
FIG. 3 is a functional block diagram of an exemplary client computing device.

Referring now to FIG. 3, a functional block diagram of the client computing device 134 is illustrated. The client computing device 134 comprises a processor 302 and memory 304, wherein the memory 304 has a client electronic health records application (client EHR) 306 and a client electronic health records agent application (client EHR agent) 308 loaded therein. In general, the client EHR 306 (when executed by the processor 302) is configured to interface with the server EHR 108 executing on the first server computing device 102, thereby providing the healthcare worker 136 with access to functionality of the server EHR 108. As will be described in greater detail below, the client EHR agent 308 (when executed by the processor 302) is configured to interface with the server EHR agent 122 executing on the second server computing device 116, thereby providing the healthcare worker 136 with access to functionality of the server EHR agent 122.

The client computing device 134 may comprise a data store 310. The data store 310 may include clinical data 312 for patients and a VPO 314. It is understood that there may be some overlap between the clinical data 312 and the clinical data 112 retained in the data store 110 of the first server computing device 102. It is also to be understood that the clinical data 312 is data generated from the EHR, while data in the VPO 314 is aggregated from a plurality of sources. The VPO 314 may be a local copy of the VPO 128 retained in the data store 126 of the second server computing device 116. The VPO 314 may be an optimized VPO (described below). The VPO 314 may also be an optimized VPO that does not include domains of clinical data that are not likely to be used by the healthcare worker 136 in treating the patient. While the data store 310 is depicted as including a single VPO, it is to be understood that the data store 310 may include many different VPOs for many different patients.

The client computing device 134 may further include a display 316, whereupon graphical features 318 may be presented thereon. For instance, a GUI for the client EHR 306 and/or a GUI for the client EHR agent 308 may be part of the graphical features 318. The display 316 may be a touchscreen. The client computing device 134 may also include input components 320 suitable for data input. The input components 320 may include a mouse, a keyboard, a trackpad, a scroll wheel, a touchscreen, a microphone, a camera, a video camera, etc.

With reference generally to FIGS. 1-3, exemplary operation of the computing system 100 is now set forth. It is contemplated that the healthcare worker 136 wishes to access information of a patient in order to treat the patient. The client computing device 134 can receive user credentials from the healthcare worker 136, and can transmit the user credentials to the first server computing device 102. The server EHR 108 can authenticate the healthcare worker 136 based upon the user credentials, and can provide the healthcare worker 136 with access to the functionality of the server EHR 108 via the client EHR 306 executing on the client computing device 134. In an example, the client EHR 306 may present a GUI on the display 316 that displays patient information for the patient.

The client computing device 134 may then transmit an identifier for the healthcare worker to the server EHR agent 122. Subsequent to, prior to, or concurrently with transmitting the identifier for the healthcare worker to the server EHR agent 122, the client computing device 134 may also transmit an identifier for the patient to the server EHR agent 122. In an example, the client computing device 134 may receive the identifier for the patient as input from the healthcare worker 136. In another example, the client computing device 134 may "screen-scrape" the identifier for the patient from the GUI of the client EHR 306.

The server EHR agent 122 may then receive the identifier for the healthcare worker 136, as well as the identifier for the patient, from the client computing device 134. The server EHR agent 122 retrieves the audit table 132 for the healthcare worker 136 using the identifier for the healthcare worker 136. More specifically, the server EHR agent 122 may execute a search over the data store 126 based upon the identifier for the healthcare worker 136. The search produces search results, wherein the search results include the audit table 132 for the healthcare worker 136.

The server EHR agent 122 also retrieves the VPO 128 for the patient using the identifier for the patient. More specifically, the server EHR agent 122 may execute a search over the data store 126 based upon the identifier for the patient. The search produces search results, wherein the search results include the VPO 128 for the patient. As discussed above, the VPO 128 for the patient comprises domains of clinical data for the patient aggregated from a plurality of sources.

The server EHR agent 122 then provides the audit table 132 and the VPO 128 as input to the computer-implemented machine learning model 130. The machine learning engine 124 of the server EHR agent 122 executes the machine learning model 130 such that the machine learning model 130 identifies a subset of domains in the domains of clinical data based upon the audit table 132, the VPO 128, and the learned weights. The subset of domains is likely to be used by the healthcare worker 136 in treating the patient. In a specific example, the machine learning model 130 may output a value for each domain of clinical data in the VPO 128. The value for each domain is indicative of a likelihood that the healthcare worker 136 will use data in the domain of clinical data in treating the patient. When a value for a domain is above a certain threshold value, the server EHR agent 122 may include the domain within the subset of domains. When the value for the domain is equal to or below a certain threshold value, the server EHR agent 122 may fail to include the domain within the subset of domains.

The server EHR agent 122 then generates an optimized VPO for the patient by marking the subset of domains within the VPO 128. More specifically, the server EHR agent 122 may cause data indicative of contextual relevance of each domain of clinical information to be included within the VPO. In an example, if the output of the machine learning model 130 indicates that medications and laboratory results of the patient are likely to be used by the healthcare worker 136 in treating the patient, the server EHR agent 122 may mark the domain for medications of the patient and the domain for laboratory results of the patient within the VPO. In an embodiment, the server EHR agent 122 may store the optimized VPO within the data store 126 (or another data store).

Subsequently, the server EHR agent 122 transmits the optimized VPO to the client EHR agent 308. Responsive to receiving the optimized VPO, the client EHR agent 308 presents identifiers for the domains of clinical data of the optimized VPO within a GUI for the client EHR agent 308. Identifiers for the subset of domains are visually highlighted within the GUI to indicate that the subset of domains are likely to be used by the healthcare worker 136 in treating the patient. With more specificity, the client EHR agent 308 may cause the identifiers for the subset of domains to be visually highlighted within the GUI as a result of the marking of each domain in the subset of domains within the optimized VPO.

In an embodiment, the identifiers for the domains of clinical data are presented as an ordered list within the GUI for the client EHR agent 308. The identifiers for the subset of domains are presented at a beginning (i.e., top) of the ordered list within the GUI.

In an example, the client EHR agent 308 may receive a selection of an identifier in the subset of domains of clinical data. Responsive to receiving the selection, the client EHR agent 308 may cause data from the domain of clinical data to be presented within the GUI. Additionally, the client EHR agent 308 may also transmit an indication to the server EHR agent 122 indicating that the domain of clinical data has been selected within the client EHR agent 308. The server EHR agent 122 may then update the audit table 132 based upon the indication such that the audit table 132 now records that the domain of clinical data has been selected within the client EHR agent 308. More specifically, the server EHR agent 122 may record that the domain of clinical data for the patient has been viewed on the datetime. The server EHR agent 122 may also update the learned weights of the machine learning model 130 based upon the indication.

In an embodiment, the computer-implemented machine learning model 130 may additionally identify a second subset of domains in the domains based upon the audit table 132, the VPO 128, and the learned weights. The second subset of domains is not likely to be used by the healthcare worker 136 in treating the patient. The server EHR agent 122 marks each domain in the subset of domains with a first marker and each domain in the second subset of domains with a second marker. In the embodiment, the server EHR agent 122 may remove the second subset of domains from the optimized VPO (while retaining identifiers for the second subset of domains). The server EHR agent 122 transmits the optimized VPO to the client EHR agent 308. Responsive to receiving the optimized VPO, the client EHR agent 308 presents identifiers for the domains of clinical data within a GUI for the client EHR agent 308. As a result of the first marker, identifiers for the subset of domains are visually highlighted with first visual indicia within the GUI to indicate that the subset of domains are likely to be used by the healthcare worker 136 in treating the patient. As a result of the second marker, identifiers for the second subset of domains are visually highlighted with second visual indicia within the GUI to indicate that the second subset of domains is not likely to be used by the healthcare worker 136 in treating the patient. For instance, the first visual indicia may be a bold font for the identifiers for the subset of domains and the second visual indicia may be a greyed-out font for the identifiers for the second subset of domains. In the event that the healthcare worker 136 wishes to view (data from) a domain of clinical data in the second subset of domains, the client EHR agent 308 can receive an identifier for the domain of clinical data in the second subset of domains as input from the healthcare worker 136. The client EHR agent 308 can then transmit the identifier for the domain to the server EHR agent 122. The server EHR agent 122 then retrieves data from the domain of clinical data from the VPO 128 using the identifier for the domain of clinical data. The server EHR agent 122 then transmits the data of the domain to the client EHR agent 308, wherein the client EHR agent 308 presents the data of the domain within the GUI. The server EHR agent 122 may also update the audit table 132 and/or weights of the machine learning model 130 subsequent to receiving the identifier for the domain of clinical data in the second subset of domains of clinical data.

It is understood that the EHR agent described above may be utilized by different healthcare workers. Accordingly, in an embodiment, the server EHR agent 122 may receive an identifier for a second healthcare worker from a second client computing device operated by a second healthcare worker. In an example, the healthcare worker 136 may be a general practitioner while the second healthcare may be a specialist. The second client computing device is in communication with the second server computing device 116 by way of the network 114 (or another network). Similar to the process described above, the server EHR agent 122 may retrieve a second audit table for the second healthcare worker using the identifier for the second healthcare worker. The second audit table comprises a history of interactions of the second healthcare worker with the client EHR agent. The server EHR agent 122 also receives an identifier for the patient from the second client computing device and retrieves the VPO 128 for the patient using the identifier for the patient. The server EHR agent 122 then provides the second audit table and the VPO as input to the machine learning model 130. Alternatively, the EHR agent 122 may provide the second audit table and the VPO 128 to another machine learning model, such as a machine learning model assigned to the second healthcare worker. The machine learning model 130 identifies a second subset of domains in the domains of clinical data that is likely to be used by the second healthcare worker in treating the patient based upon the second audit table, the VPO, and the learned weights. The server EHR agent 122 then generates a second optimized VPO by marking each domain the second subset of domains within the VPO. The server EHR agent 122 transmits the second optimized VPO to the client EHR agent executing on the second client computing device. The client EHR agent presents identifiers for the domains of clinical data within a second GUI presented on a second display of the second client computing device. Identifiers for the second subset of domains are visually highlighted within the second GUI as a result of the marking of each domain in the second subset of domains within the optimized VPO.

Figure 4:
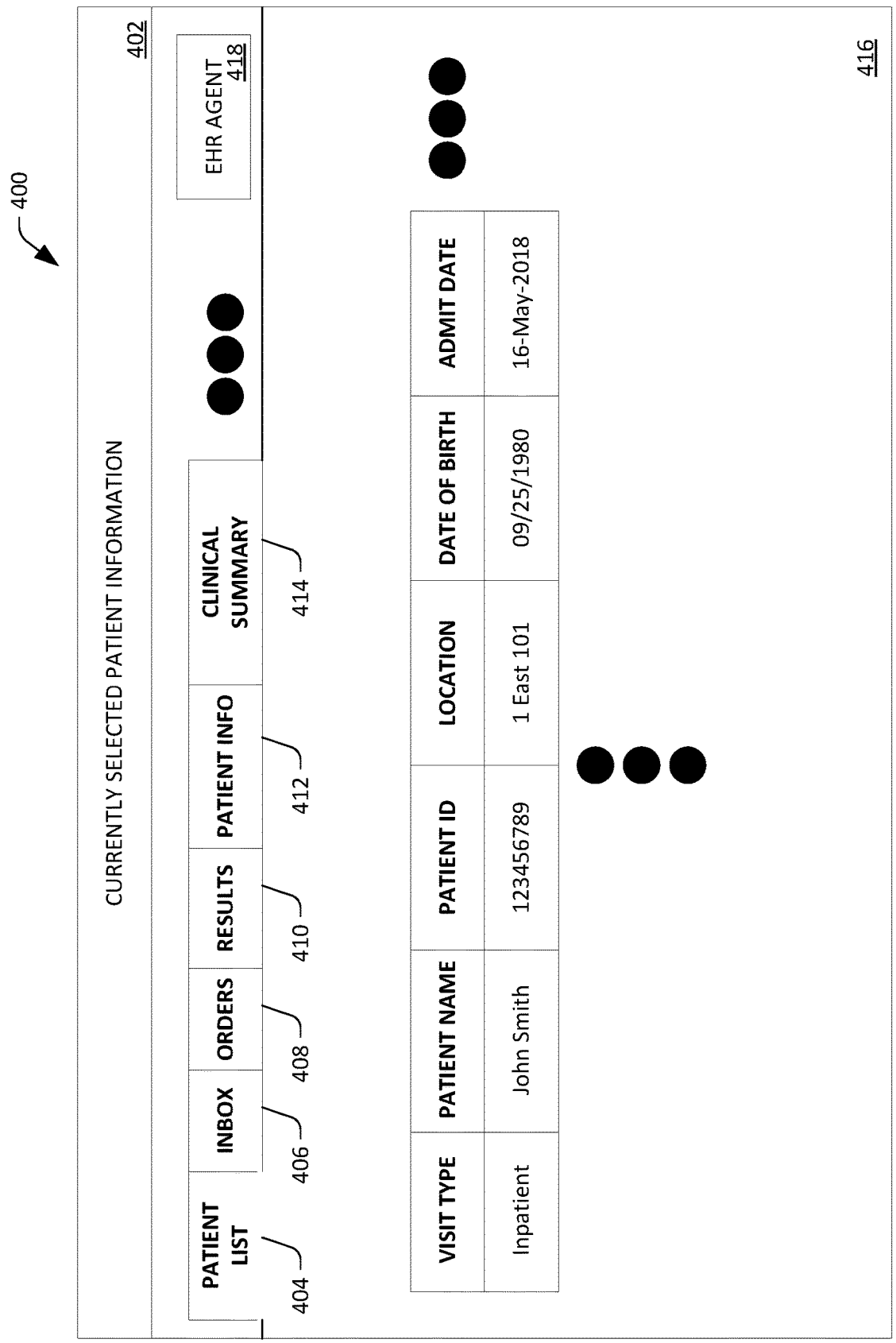
FIG. 4 is a depiction of an exemplary graphical user interface (GUI) for a client electronic health records application.

Turning now to FIG. 4, an exemplary GUI 400 for the client EHR 306 that can be presented on the display 316 of the client computing device 134 is illustrated. The GUI 400 comprises a current patient window 402 that displays information of a patient. For example, the current patient window 402 may display a name of the patient, a medical record number of the patient, a date of birth of the patient, an age of the patient, and/or an address of the patient. The GUI 400 comprises a plurality of selectable tabs 404-414. For instance, the plurality of tabs 404-414 may include a patient list tab 404, an inbox tab 406, an orders tab 408, a results tab 410, a patient information tab 412, and a clinical summary tab 414. In the GUI 400 shown in FIG. 4, the patient list tab 404 has been selected, and as such an active window 416 of the GUI 400 displays a list of information relating to patients. For instance, the list of information may include a type of visit for each patient, a patient name, a patient identifier (i.e., a medical record number), a location of each patient in a healthcare facility (i.e., a room number), a date of birth for the patient, and an admit date of the patient.

The GUI 400 also includes an EHR agent button 418. When the GUI 400 receives a selection of the EHR agent button 418, the client computing device 134 may cause a GUI for the client EHR agent 308 to be presented on the display 316 of the client computing device 134. In an embodiment, the selection of the EHR agent button 418 may cause an identifier for the healthcare worker 136 and/or an identifier for a patient to be transmitted to the server EHR agent 122. For instance, the identifier for the patient may be for a patient having his/her information currently displayed in the GUI 400.

With reference now to FIG. 5, an exemplary GUI 500 for the client EHR agent 308 is illustrated. The GUI 500 may be presented on the display 316 of the client computing device 134 when the GUI 400 receives a selection of the EHR agent button 418. In an embodiment, the GUI 500 may be presented on the display 316 as an overlay to the GUI 400 for the client EHR 306. In another embodiment, the GUI 500 may be presented in a window separate from the GUI 400 for the client EHR 306.

The GUI 500 includes a demographic portion 502, an external applications portion 504, and an options portion 506. The demographic portion 502 displays demographic information for a patient. For instance, the demographic portion 502 may include a name of the patient, an age of the patient, a sex of the patient, etc. The external applications portion 504 may include selectable buttons assigned to different applications external to the client EHR agent 308. When the GUI 500 receives a selection of a selectable button in the selectable buttons that is assigned to an external application, the client EHR agent 308 may cause the external application to be launched. The options portion 506 may include various options with respect to the client EHR agent 308. For instance, the options portion 506 may include a print button to print data displayed within the GUI 500, an export button to export data displayed within the GUI 500, etc.

The GUI 500 further includes identifiers for domains of clinical data 508-534 that correspond to the domains of clinical data for the patient in the VPO 128 (described above). For instance, the identifiers for the domains clinical data 508-534 may include an identifier for encounters of the patient 508, an identifier for problems of the patient 510, an identifier for a past medical history of the patient 512, an identifier for diagnoses of the patient 514, an identifier for allergies of the patient 516, an identifier for medications of the patient 518, an identifier for measurements of the patient 520, an identifier for laboratory results of the patient 522, an identifier for a pathology for the patient 524, an identifier for immunizations of the patient 526, an identifier for imaging of the patient 528, an identifier for procedures of the patient 530, an identifier for documents of the patient 532, and/or an identifier for external documents of the patient 534. Each identifier in the identifiers for the domains of clinical data is individually selectable within the GUI 500. When the GUI 500 receives a selection of an identifier in the identifiers for the domains of clinical data, the client EHR agent 308 may cause data from the domain of clinical data to be presented within the GUI 500.

Turning now to FIG. 6, an exemplary GUI 600 for the client EHR agent 308 after an optimized VPO has been generated from the VPO 128 is illustrated. Like the GUI 500 described above, the GUI 600 may be presented on the display 316 of the client computing device 134 as either an overlay to the GUI 400 for the client EHR 306 or the GUI 600 may be presented in a window separate from the GUI 400 for the client EHR 306.

The GUI 600 includes the demographic portion 502, the external applications portion 504, and the options portion 506. The GUI 600 also includes the identifiers for the domains clinical data 508-534. However, in the GUI 600, the identifier for the laboratory results of the patient 522 and the identifier for the medications of patient 518 are highlighted to indicate that the laboratory results for the patient and the medications of the patient are likely to be used by the healthcare worker 136 in treating the patient. Moreover, the identifier for the laboratory results for the patient 522 has been moved up within the GUI 600 such that the identifier for the laboratory results for the patient 522 appears first in the identifiers for the domains clinical data 508-534 to further indicate that the laboratory results of the patient are likely to be used by the healthcare worker 136 in treating the patient.

Figure 7:
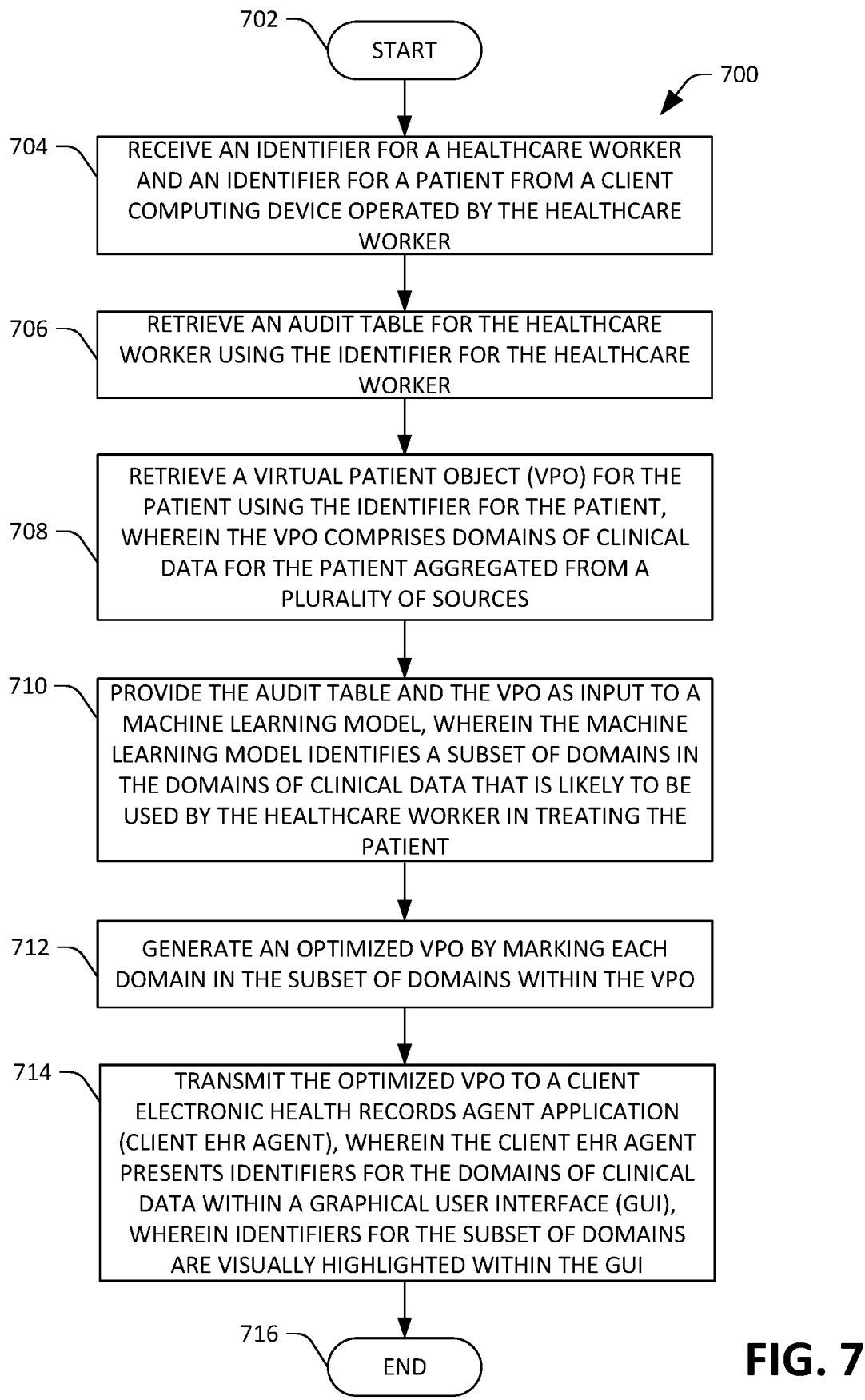
FIG. 7 is a flow diagram that illustrates an exemplary methodology performed by a server electronic health records agent application for presenting contextually relevant information to a healthcare worker.
Figure 8:
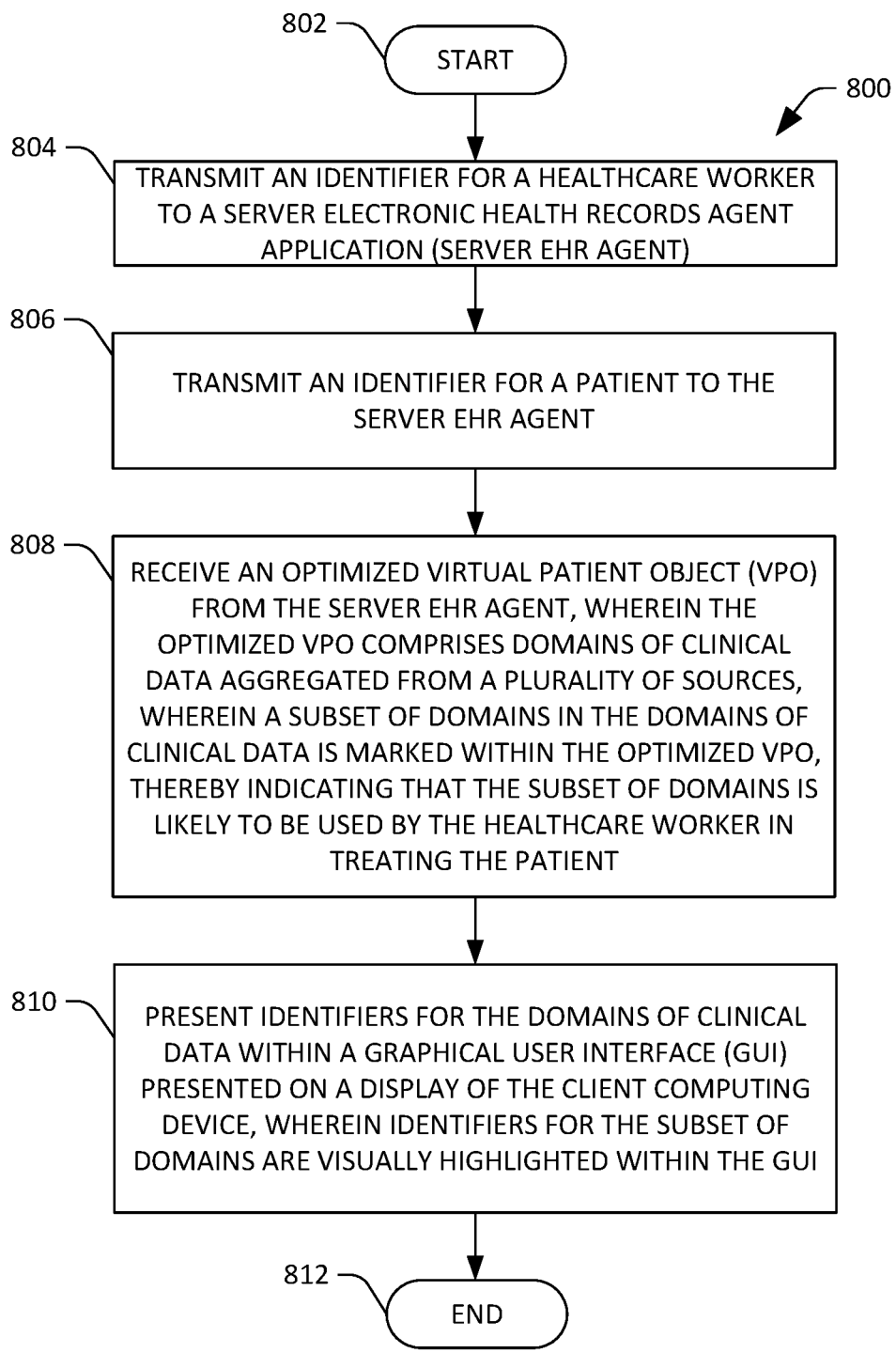
FIG. 8 is a flow diagram that illustrates an exemplary methodology performed by a client electronic health records agent application for presenting contextually relevant information to a healthcare worker.

FIGS. 7 and 8 illustrate exemplary methodologies relating to presenting contextually relevant information to a healthcare worker. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 performed by a server EHR agent for identifying domains of clinical data that are likely to be used by a healthcare worker in treating a patient is illustrated. The methodology 700 begins at 702, and at 704 the server EHR agent receives an identifier for a healthcare worker and an identifier for a patient from a client computing device operated by the healthcare worker. At 706, the server EHR agent retrieves an audit table for the healthcare worker using the identifier for the healthcare worker. The audit table comprises a history of interactions of the healthcare worker with a client EHR agent. At 708, the server EHR agent retrieves a VPO for the patient using the identifier for the patient. The VPO comprises domains of clinical data for the patient aggregated from a plurality of sources.

At 710, the server EHR agent provides the audit table and the VPO as input to a computer-implemented machine learning model having learned assigned weights thereto. The machine learning model identifies a subset of domains in the domains of clinical data that is likely to be used by the healthcare worker in treating the patient based upon the audit table, the VPO, and the learned weights. At 712, the server EHR agent generates an optimized VPO by marking each of the subset of domains within the VPO. At 714, the server EHR agent transmits the optimized VPO to a client EHR agent executing on a client computing device. The client EHR agent presents identifiers for the domains of clinical data within a GUI. Identifiers for the subset of domains are visually highlighted within the GUI as a result of the marking of each of the subset of domains within the optimized VPO. The methodology 700 concludes at 716.

Turning now to FIG. 8, a methodology 800 performed by a client EHR agent for presenting a visual representation of an optimized VPO is illustrated. The methodology 800 begins at 802, and at 804, the client EHR agent transmits an identifier for a healthcare worker to a server EHR agent. At 806, the client EHR agent transmits an identifier for a patient to the server EHR agent. At 808, the client EHR agent receives an optimized VPO from the server EHR agent. The optimized VPO comprises domains of clinical data aggregated from a plurality of sources. A subset of domains in the domains of clinical data is marked in the optimized VPO, thereby indicating that the subset of domains is likely to be used by the healthcare worker in treating the patient. At 810, responsive to receiving the optimized VPO, the client EHR agent presents identifiers for the domains of clinical data within a GUI presented on a display of the client computing device. Identifiers for the subset of domains are visually highlighted within the GUI as a result of the marking of each domain in the subset of clinical domains in the optimized VPO. The methodology 800 concludes at 812.

Figure 9:
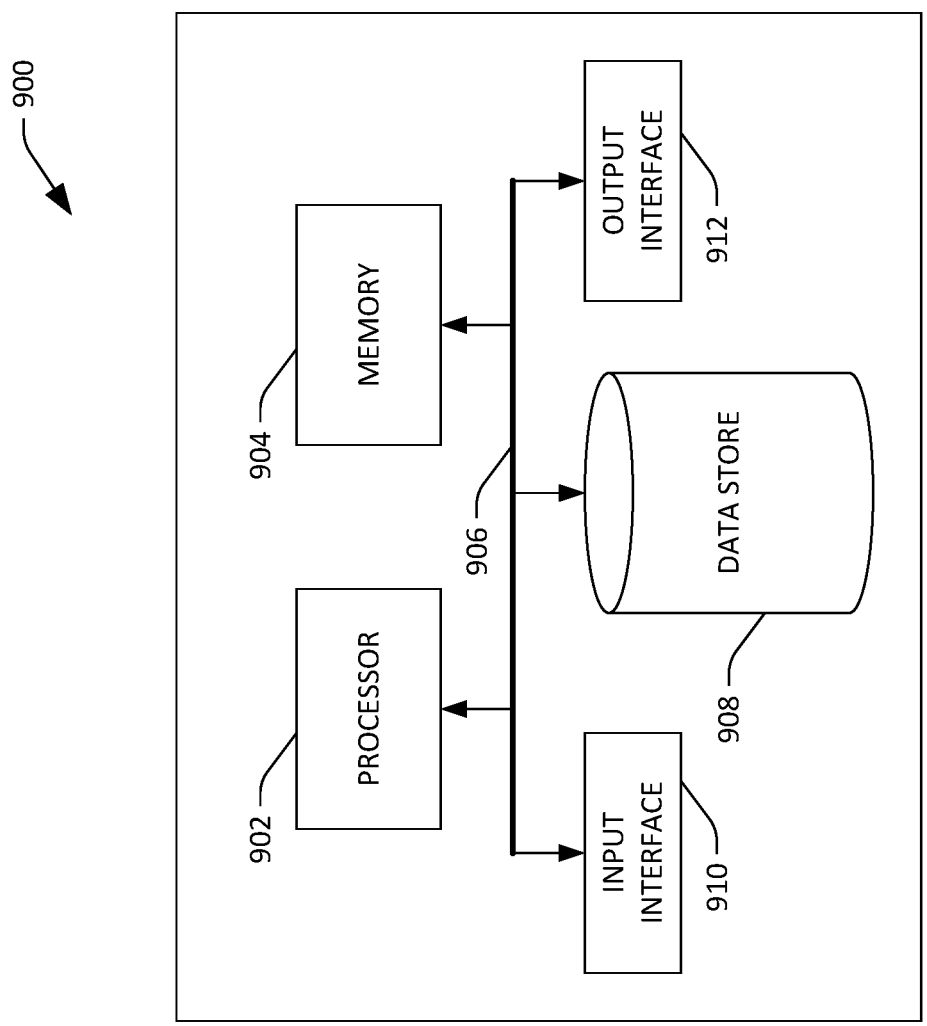
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that generates an optimized VPO for a patient. By way of another example, the computing device 900 can be used in a system that displays a GUI for a client EHR agent application. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store clinical data, computer-implemented machine learning models, VPOs, optimized VPOs, audit tables, etc.

The computing device 900 additionally includes a data store 908 that is accessible by the processor 902 by way of the system bus 906. The data store 908 may include executable instructions, clinical data, computer-implemented machine learning models, VPOs, optimized VPOs, audit tables, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:
    a processor; and
    memory storing a server electronic health records agent application (server EHR agent) that is configured to access health records for patients that are inaccessible to an electronic health records application executing on a second server computing device, wherein the server EHR agent, when executed by the processor, causes the processor to perform acts comprising:
        receiving an identifier for a healthcare worker from a client computing device operated by a healthcare worker, the client computing device is in network communication with the server computing device;
        retrieving an audit table for the healthcare worker using the identifier for the healthcare worker, wherein the audit table comprises a history of interactions of the healthcare worker with a client electronic health records agent application (client EHR agent);
        receiving an identifier for a patient from the client computing device, wherein the patient is currently being treated by the healthcare worker at a point of care;
        retrieving a virtual patient object (VPO) for the patient using the identifier for the patient, wherein the VPO comprises identifiers for domains and clinical data for the patient aggregated from a plurality of sources, and further wherein the clinical data for the patient is stored and organized within the VPO according to the domains, where each domain includes a different type of clinical data;
        providing the audit table and the VPO as input to a computer-implemented machine learning model that has learned weights assigned thereto, wherein the computer-implemented machine learning model identifies a first domain and a second domain within the domains based upon the audit table, the VPO, and the learned weights, wherein the first domain comprises a first subset of the clinical data for the patient determined by the computer-implemented machine learning model to be likely to be used by the healthcare worker while the healthcare worker is treating the patient at the point of care, and the second domain comprises a second subset of the clinical data for the patient determined by the computer-implemented machine learning model as not likely to be used by the healthcare worker while the healthcare working is treating the patient at the point of care;
        generating an optimized VPO based upon the VPO and the first and second domains identified by the computer-implemented machine learning model, wherein the optimized VPO comprises:
            the identifiers for the domains;
            a marking assigned to an identifier for the first domain, wherein the optimized VPO includes the first subset of clinical data; and
            a marking assigned to an identifier for the second domain, wherein the optimized VPO does not include the second subset of clinical data; and
        transmitting the optimized VPO to the client EHR agent, wherein identifiers for the domains are presented within a graphical user interface (GUI) presented on a display of the client computing device responsive to the client EHR agent receiving the optimized VPO from the server EHR agent, wherein the identifier for the first domain is visually highlighted within the GUI based upon the marking in the optimized VPO to indicate that the first domain includes the subset of the clinical data for the patient that is likely to be used by the healthcare worker while the healthcare worker is treating the patient at the point of care, wherein the identifier for the second domain is visually highlighted within the GUI based upon the marking in the optimized VPO to indicate that the second domain is not included in the optimized VPO, and further wherein the subset of the clinical data of the first domain is presented on the display to the healthcare worker when the identifier for the first domain is selected.

2. The server computing device of claim 1, wherein a client electronic health records application (client EHR) is executed by the client computing device, wherein the GUI for the client EHR agent is presented as an overlay to a second GUI for the client EHR presented on the display of the client computing device.

3. The server computing device of claim 1, wherein the domains include at least one of:
    encounters of the patient;
    problems of the patient;
    a medical history of the patient;
    diagnoses of the patient;
    allergies of the patient;
    medications of the patient;
    measurements of the patient;
    lab results of the patient;
    a pathology of the patient;
    immunizations of the patient;
    imaging of the patient;
    procedures that the patient has undergone;
    documents of the patient; or
    external documents of the patient.

4. The server computing device of claim 1, wherein the plurality of sources includes a first server electronic health records application and a second server electronic health records application.

5. The server computing device of claim 1, wherein the computer-implemented machine learning model outputs a value for each domain in the domains, wherein the value for the domain is indicative of a likelihood that the subset of the clinical data will be used by the healthcare worker in treating the patient.

6. The server computing device of claim 1, wherein the history of interactions of the audit table includes an identifier for the domain, an indication of a datetime on which the domain was previously selected within the GUI, and the identifier for the patient.

7. The server computing device of claim 1, the acts further comprising:
receiving an indication from the client EHR agent that the first domain has been selected within the client EHR agent; and
updating the audit table based upon the indication such that the history of interactions in the audit table reflects that the first domain has been selected within the client EHR agent.

8. The server computing device of claim 1, the acts further comprising:
receiving an identifier for a second healthcare worker from a second client computing device operated by a second healthcare worker, the second client computing device is in network communication with the server computing device;
retrieving a second audit table for the second healthcare worker using the identifier for the second healthcare worker, wherein the second audit table comprises a history of interactions of the second healthcare worker with the client EHR agent;
receiving the identifier for the patient from the second client computing device;
retrieving the VPO for the patient using the identifier for the patient,
providing the second audit table and the VPO as input to the computer-implemented machine learning model, wherein the computer-implemented machine learning model identifies the second domain in the domains based upon the second audit table, the VPO, and the learned weights, wherein the second domain includes the second subset of the clinical data for the patient, wherein the second subset of the clinical data determined by the computer-implemented machine learning model to be likely to be used by the second healthcare worker while the second healthcare worker is treating the patient;
generating a second optimized VPO based upon the VPO and the second domain identified by the computer-implemented machine learning model, wherein the second optimized VPO comprises:
the identifiers for the domains;
a second marking assigned to an identifier for the second domain; and
the second subset of the clinical data included in the second domain, wherein the second optimized VPO fails to include the subset of the clinical data due to the subset of the clinical data not being included in the second domain; and
transmitting the second optimized VPO to the client EHR agent, wherein the identifiers for the domains of clinical data are presented within a second GUI presented on a second display of the second client computing device responsive to the second client computing device receiving the second optimized VPO, wherein an identifier for the second domain is visually highlighted within the second GUI based upon the second marking in the second optimized VPO to indicate that the second domain includes the second subset of the clinical data for the patient that is likely to be used by the second healthcare worker while the second healthcare worker is treating the patient, and further wherein the second subset of the clinical data is presented on the display to the second healthcare worker when the identifier for the second domain is selected.

9. The server computing device of claim 1, the acts further comprising:
receiving an identifier for the second domain from the client EHR agent;
retrieving clinical data corresponding to the second domain from the VPO for the patient using the identifier for the second domain; and
transmitting the clinical data corresponding to the second domain to the client EHR agent, wherein the clinical data corresponding to the second domain is presented within the GUI.

10. The server computing device of claim 1, wherein retrieving the audit table for the healthcare worker comprises executing a search over a data store retaining audit tables for a plurality of healthcare workers, wherein the search is based upon the identifier for the healthcare worker, wherein the search produces search results that include the audit table.

11. A method performed by a server electronic health records agent application (server EHR agent) executing on a server computing device, wherein the server EHR agent is configured to access health records for patients that are inaccessible to an electronic health records application executing on a second server computing device, the method comprising:
receiving an identifier for a healthcare worker and an identifier for a patient from a client computing device operated by the healthcare worker, the client computing device is in network communication with the server computing device, wherein the patient is currently being treated by the healthcare worker at a point of care;
retrieving an audit table for the healthcare worker using the identifier for the healthcare worker, wherein the audit table comprises a history of interactions of the healthcare worker with a client electronic health records agent application (client EHR agent);
retrieving a virtual patient object (VPO) for the patient using the identifier for the patient, wherein the VPO comprises identifiers for domains and clinical data for the patient aggregated from a plurality of sources, and further wherein the clinical data for the patient is stored and organized within the VPO according to the domains, where each domain includes a different type of clinical data;
providing the audit table and the VPO as input to a computer-implemented machine learning model that has learned weights assigned thereto, wherein the computer-implemented machine learning model identifies a first domain and a second domain within the domains based upon the audit table, the VPO, and the learned weights, wherein the first domain comprises a first subset of the clinical data for the patient determined by the computer-implemented machine learning model to be likely to be used by the healthcare worker while the healthcare worker is treating the patient at the point of care, and the second domain comprises a second subset of the clinical data for the patient determined by the computer-implemented machine learning model as not likely to be used by the healthcare worker while the healthcare working is treating the patient at the point of care;
generating an optimized VPO based upon the VPO and the first and second domains identified by the computer-implemented machine learning model, wherein the optimized VPO comprises:
the identifiers for the domains;
a marking assigned to an identifier for the first domain, wherein the optimized VPO includes the first subset of clinical data corresponding to the first domain;
a marking assigned to an identifier for the second domain, wherein the optimized VPO does not include the second subset of clinical data corresponding to the second domain; and
transmitting the optimized VPO to the client EHR agent, wherein identifiers for the domains are presented within a graphical user interface (GUI) presented on a display of the client computing device responsive to the client EHR agent receiving the optimized VPO from the server EHR agent, wherein the identifier for the first domain is visually highlighted within the GUI based upon the marking in the optimized VPO to indicate that the first domain includes the subset of the clinical data for the patient that is likely to be used by the healthcare worker while the healthcare worker is treating the patient at the point of care, wherein the identifier for the second domain is visually highlighted within the GUI based upon the marking in the optimized VPO to indicate that the second domain is not included in the optimized VPO, and further wherein the subset of the clinical data is presented on the display to the healthcare worker when the identifier for the first domain is selected.

12. The method of claim 11 further comprising:
prior to providing the audit table and the VPO as input to the computer-implemented machine learning model, selecting the computer-implemented machine learning model from amongst a plurality of computer-implemented machine learning models based upon the identifier for the healthcare worker, wherein each computer-implemented machine learning model in the plurality of computer-implemented machine learning models is assigned to a different healthcare worker, wherein the computer-implemented machine learning model is assigned to the healthcare worker.

13. The method of claim 11 further comprising:
prior to providing the audit table and the VPO as input to the computer-implemented machine learning model, retrieving a set of weights assigned to the healthcare worker from amongst a plurality of sets of weights for different healthcare workers based upon the identifier for the healthcare worker; and
replacing the learned weights with the set of weights assigned to the healthcare worker.

14. The method of claim 11, wherein retrieving the VPO for the patient comprises executing a search over a data store retaining VPOs for a plurality of patients, wherein the search is based upon the identifier for the patient, wherein the search produces search results that include the VPO for the patient.

15. The method of claim 11, wherein the client computing device executes a client electronic health records application (client EHR), wherein the GUI for the client EHR agent is presented as an overlay to a second GUI for the client EHR presented on the display of the client computing device.

16. The method of claim 11, wherein the domains include at least one of:
encounters of the patient;
problems of the patient;
a medical history of the patient;
diagnoses of the patient;
allergies of the patient;
medications of the patient;
measurements of the patient;
lab results of the patient;
a pathology of the patient;
immunizations of the patient;
imaging of the patient;
procedures that the patient has undergone;
documents of the patient; or
external documents of the patient.

17. A computer-readable storage medium comprising a server electronic health records agent application (server EHR agent) that is configured to access health records for patients from sources inaccessible to a server electronic health records application, the server EHR agent, when executed by a processor of a server computing device, performs acts comprising:
receiving an identifier for a healthcare worker and an identifier for a patient from a client computing device operated by the healthcare worker, the client computing device is in network communication with the server computing device, wherein the patient is currently being treated by the healthcare worker at a point of care;
retrieving an audit table for the healthcare worker using the identifier for the healthcare worker, wherein the audit table comprises a history of interactions of the healthcare worker with a client electronic health records agent application (client EHR agent);
retrieving a virtual patient object (VPO) for the patient using the identifier for the patient, wherein the VPO comprises identifiers for domains and clinical data for the patient aggregated from a plurality of sources, and further wherein the clinical data for the patient is stored and organized within the VPO according to the domains, where each domain includes a different type of clinical data;
providing the audit table and the VPO as input to a computer-implemented machine learning model that has learned weights assigned thereto, wherein the computer-implemented machine learning model identifies a first domain within the domains and a second domain within the domains based upon the audit table, the VPO, and the learned weights, wherein the first domain includes a first subset of the clinical data for the patient determined by the computer-implemented machine learning model to be likely to be used by the healthcare worker while the healthcare worker is treating the patient at the point of care, wherein the second domain includes a second subset of the clinical data for the patient determined by the computer-implemented machine learning model to be not likely to be used by the healthcare worker while the healthcare worker is treating the patient at the point of care;
generating an optimized VPO based upon the VPO and the domain identified by the computer-implemented machine learning model, wherein the optimized VPO comprises:
the identifiers for the domains;
a marking assigned to the first domain, wherein the optimized VPO includes the first subset of clinical data; and
a marking assigned to an identifier for the second domain, wherein the optimized VPO does not include the second subset of clinical data;
transmitting the optimized VPO to the client EHR agent, wherein identifiers for the domains are presented within a graphical user interface (GUI) presented on a display of the client computing device responsive to the client EHR agent receiving the optimized VPO from the server EHR agent, wherein an identifier for the first domain is visually highlighted with first visual indicia based upon the marking to indicate that the first domain includes the first subset of the clinical data for the patient that is likely to be used by the healthcare worker while the healthcare worker is treating the patient at the point of care, wherein an identifier for the second domain is visually highlighted with second visual indicia to indicate that the second domain includes the second subset of the clinical data that is not likely to be used by the healthcare worker while the healthcare worker is treating the patient at the point of care, and further wherein the first subset of the clinical data is presented on the display to the healthcare worker when the identifier for the first domain is selected.

18. The computer-readable storage medium of claim 17, wherein the identifiers for the domains are presented as an ordered list within the GUI, wherein the identifier for the first domain is presented at a beginning of the ordered list.

19. The computer-readable storage medium of claim 17, wherein the client computing device executes a client electronic health records application (client EHR), wherein the GUI for the client EHR agent is presented as an overlay to a second GUI for the client EHR presented on the display of the client computing device.

20. The computer-readable storage medium of claim 17, wherein the plurality of sources include a health information exchange (HIE).

* * * * *